UNITED STATES PATENT OFFICE.

WILLIAM R. MACKLIND, OF CLEVELAND, AND EDWARD C. HOLTON, OF OLMSTED FALLS, OHIO, ASSIGNORS TO THE SHERWIN-WILLIAMS COMPANY, OF CLEVELAND, OHIO, A CORPORATION OF OHIO.

METHOD OF MAKING AN INSECTICIDE.

1,243,323.      Specification of Letters Patent.      Patented Oct. 16, 1917.

No Drawing.      Application filed March 13, 1915. Serial No. 14,163.

*To all whom it may concern:*

Be it known that we, WILLIAM R. MACKLIND and EDWARD C. HOLTON, citizens of the United States, and residents of Cleveland and Olmsted Falls, county of Cuyahoga, and State of Ohio, have invented a new and useful Method of Making an Insecticide, of which the following is a specification, the principle of the invention being herein explained and the best mode in which we have contemplated applying that principle, so as to distinguish it from other inventions.

The present improvements relate in general to a method of manufacturing an insecticide and in particular to a process for rendering available recovered smelter fumes which is a product which is at present entirely wasted and one which we have found can be treated in an inexpensive manner to make a highly effective insecticide. To the accomplishment of the foregoing and related ends, said invention, then, consists of the steps hereinafter fully described and particularly pointed out in the claims.

The following description sets forth in detail one approved method of carrying out the invention, such disclosed mode, however, constituting but one of the various ways in which the principle of the invention may be used.

In the smelting of copper and other ores the fumes contain many compounds, chiefly oxids of zinc, lead, arsenic, iron, magnesium, etc., and sulfids and anhydrids of other elements. Heretofore, no use has been known for the recovered smelter fumes and the present invention is intended for the purpose of utilizing this waste product.

The fumes from copper smelters are at present not only often entirely wasted, but when permitted to escape are very injurious to the health of the neighborhood surrounding the smelter, so much so in fact that several methods have been attempted to prevent the escape of these fumes. Smelter fumes vary in their composition according to the smelter from which they come, the main constituents being zinc oxid, arsenic compounds, lead oxid and sulfuric anhydrid, together with oxids, anhydrids and sulfids of many other metals in small or negligible quantities. In the usual fume there is approximately 40 per cent. of zinc oxid, 25 per cent. of sulfuric anhydrid, 10 per cent. of lead oxid, and approximately 10 per cent. of arsenic compounds.

In carrying out our improved method of treatment, we preferably use smelter fumes containing from ten to twenty-five per cent. of arsenic compounds by weight. If the percentage is less than ten, it may be increased by removing some of the other compounds, by leaching out the water soluble ones or by removing them in any preferred manner. If the arsenic content is greater than twenty-five per cent. it may be reduced by adding suitable materials such, for example, as zinc or calcium oxid or hydroxid. More often, however, the recovered fumes of varying arsenic content may be mixed together to produce a product having an arsenic content within the desired limits.

This initial product must then be made safe for use and must be changed into a material that suspends well in water for use as a spray. This is effected by mixing with the recovered fume an amount of calcium oxid equal to about thirty per cent. of the weight of the arsenic content therein or an amount of calcium hydroxid equal to about forty per cent. of the weight of the arsenic content. In this manner we convert a heretofore dangerous and waste product into a valuable insecticide which is well adapted for use as a spray and very effective for the purpose desired.

Not only is our new insecticide effective but also the process of making the same is simple and relatively inexpensive, involving but few operations and being capable of employment without the necessity of providing expensive and complicated apparatus.

Other forms may be employed embodying the features of our invention instead of the one here explained, change being made in the form or construction, provided the elements stated by any of the following claims or the equivalent of such stated elements be employed, whether produced by our preferred method or by others embodying steps equivalent to those stated in the following claims.

We therefore particularly point out and distinctly claim as our invention:—

1. In a method of recovering the insecticidal arsenic content from the precipitated dust from smelter fumes, the step which consists in reacting upon such dust with a hydroxid to convert such content into arsenic containing compounds.

2. In a method of recovering the insecticidal arsenic content from the precipitated dust from smelter fumes, the step which consists in reacting upon such dust with an excess of calcium hydroxid to convert such content into arsenic containing compounds.

Signed by us, this 12th day of March, 1915.

WILLIAM R. MACKLIND.
EDWARD C. HOLTON.

Attested by—
ARTHUR C. McLEAN,
WILLIAM J. CRITCHLEY.